United States Patent

[11] 3,558,864

[72] Inventor Walter K. French
Montrose, N.Y.

[21] Appl. No. 517,381
[22] Filed Dec. 29, 1965
[45] Patented Jan. 26, 1971
[73] Assignee International Business Machines Corporation
Armonk, N.Y.
a corporation of New York

[54] REFERENCE POINT DETERMINING SYSTEM
10 Claims, 4 Drawing Figs.

[52] U.S. Cl. .......... 235/150, 340/146.3
[51] Int. Cl. .......... G06j 11/00
[50] Field of Search .......... 235/150, 61.6; 283/7; 250/202; 340/146.3

[56] References Cited

UNITED STATES PATENTS

| | | | |
|---|---|---|---|
| 2,925,956 | 2/1960 | Giao et al. | 235/61.6 |
| 3,213,421 | 10/1965 | Abraham | 340/146.3 |
| 3,292,149 | 12/1966 | Bourne | 340/146.3 |
| 3,297,988 | 1/1967 | Greanias et al. | 340/146.3 |
| 3,303,465 | 2/1967 | Essinger et al. | 340/146.3 |

*Primary Examiner*—Malcolm A. Morrison
*Assistant Examiner*—Edward J. Wise
*Attorney*—Hanifin and Jancin

ABSTRACT: A system for determining a reference point in a fingerprint pattern by means of determining the average relative center of curvature of the ridges of the pattern by means of a curve follower, differentiators for X and Y with respect to time, a divider for *dx/dy* and the output therefrom passing to a squarer and a differentiator. The second derivative output is passed to a divider and the squarer and a unit generator go to an adder connected to a three-half power generator, whose output is also connected to the latter divider. The divider outputs are multiplied by cosine and sine values and added to X and Y values respectively for integration if less that a maximum radius value. These values are passed to sample and hold circuits at the end of a complete fingerprint scan.

| FIG. 2A | FIG. 2B |
|---|---|

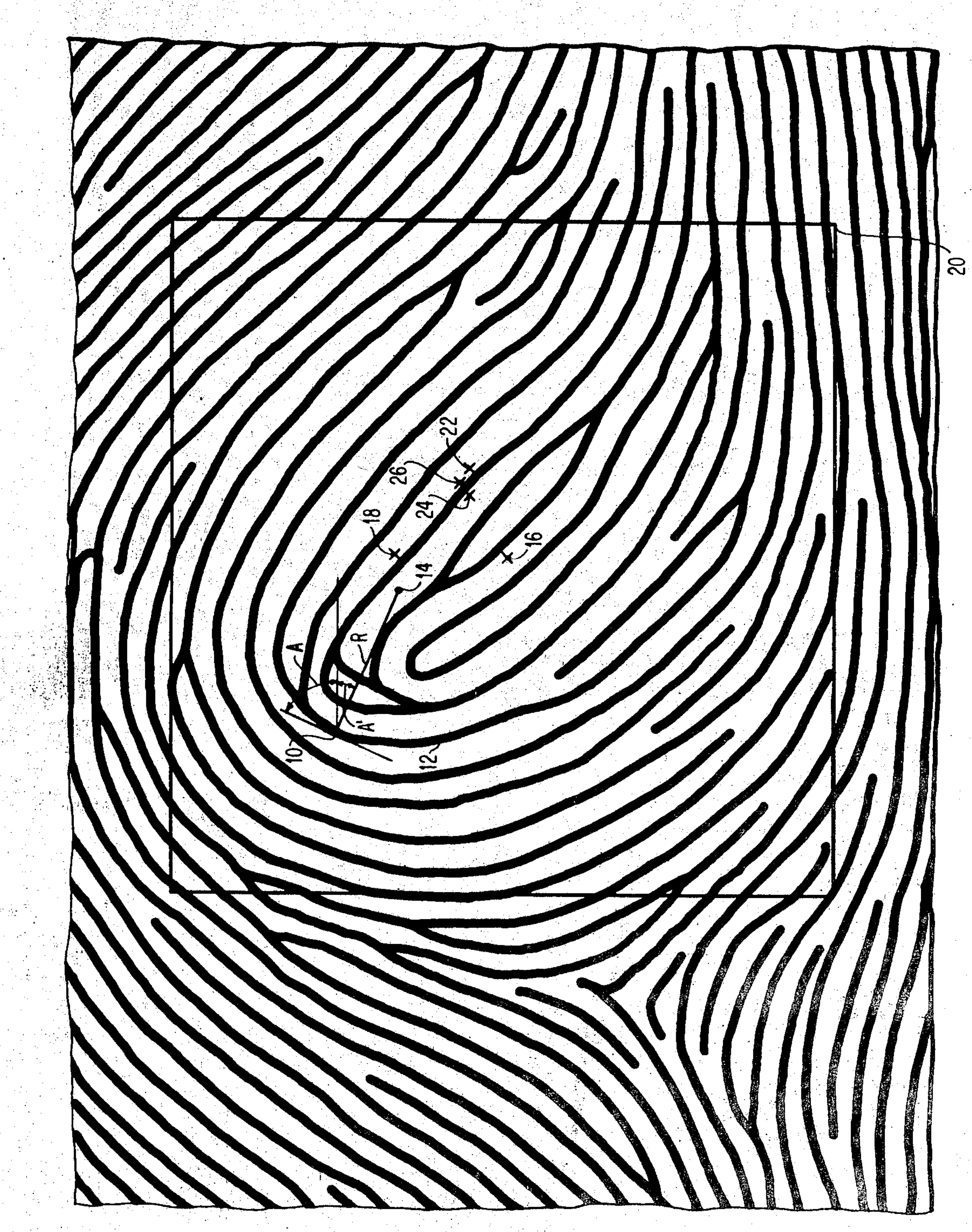
FIG. 1
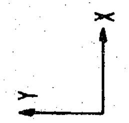
INVENTOR
WALTER K. FRENCH
BY [signature]
ATTORNEY

REFERENCE POINT DETERMINING SYSTEM

REFERENCE POINT DETERMINING SYSTEM

This invention relates to a system for determining a reference point on a line pattern and more particularly to a system for determining a reference point on a fingerprint.

As the uses to which electronic computers are applied has been expanded, various situations have arisen where it is necessary to apply information contained in line patterns to these machines. Such situations arise, for example, in the fields of topography and fingerprint recognition. In order to place the information of the line pattern in a format which is acceptable to the machine, it is necessary to either manually code the data contained therein or to provide a system for automatically recognizing and coding the pattern. Hand coding is a slow and costly procedure which requires the services of highly trained personnel. Automatic or at least semiautomatic coding of the data is therefore preferable.

In order to code a line pattern, either manually or automatically, some reference point must be provided to which the other characteristics of the pattern are related in a predetermined manner. For example, in fingerprint recognition, the core of the print is generally selected as a reference point and the fingerprint is coded by either counting ridges or measuring distances from the reference point to various other recognizable points such as bifurcations, line endings, deltas, short ridges, etc. While an individual generally has little trouble selecting a reference point, such as the center of the line pattern or a corner, a machine has considerable difficulty in making this decision. Part of this difficulty stems from the fact that the point selected as a reference point must be reproducible on the same pattern although in some instances merely being able to get into the same general area, as for example within one ridge of the same point on a fingerprint, may be adequate. Particularly in the area of fingerprint recognition the problem of obtaining a reproducible point is complicated by the fact that the print obtained, particularly a latent print such at that obtained at the scene of the crime, is either incomplete, or is blurred or smudged at various points. It is also desirable that the system employed to find the reference point on a fingerprint or similar pattern be capable of giving a reproducible result even if, for some reason several of the ridges of the print are not considered in making the determination.

It is therefore a primary object of this invention to provide a system for determining a reference point on a line pattern.

A more specific object of this invention is to provide a system for finding a reproducible reference point on a line pattern in spite of noise on the pattern such as missing, blurred, or smudged portions.

A further object of this invention is to provide a system of the type described above which is capable of providing acceptable results even if several of the lines of the pattern are not considered in making the determination.

Still another object of the invention is to provide a system of the type described above for finding a reproducible reference point on a fingerprint.

In accordance with this object this invention provides a system which either scans or samples the lines of the pattern and determines a unique point, such as the center of curvature, for each point sampled. Where a curve follower is employed to sample the line pattern or the pattern is traced into the system in a semimanual manner, the unique point is determined for all points in the line pattern. The unique points determined above are then averaged to give, for example, a point which is the average center of curvature of the lines of the pattern, and this point is then utilized as the desired reference point. Where a mutilated print, such as one having missing, blurred, or smudged portions, is provided, the desired reference point is obtained by using the results of the first scan as a center point for a relatively small window. A second scan is then performed looking only at ridges within the window and a new reference point is determined in the same manner as that described above for the first scan. This point may then either be used as the desired reference point or as the center for a new window for a third scan.

The foregoing and other objects, features and advantages of the invention will be apparent from the following more particular description of a preferred embodiment of the invention as illustrated in the accompanying drawings.

In the drawings:

FIG. 1 is a diagram of a fingerprint which is used in explaining the operation of the system of this invention.

Figures 2, 2A:
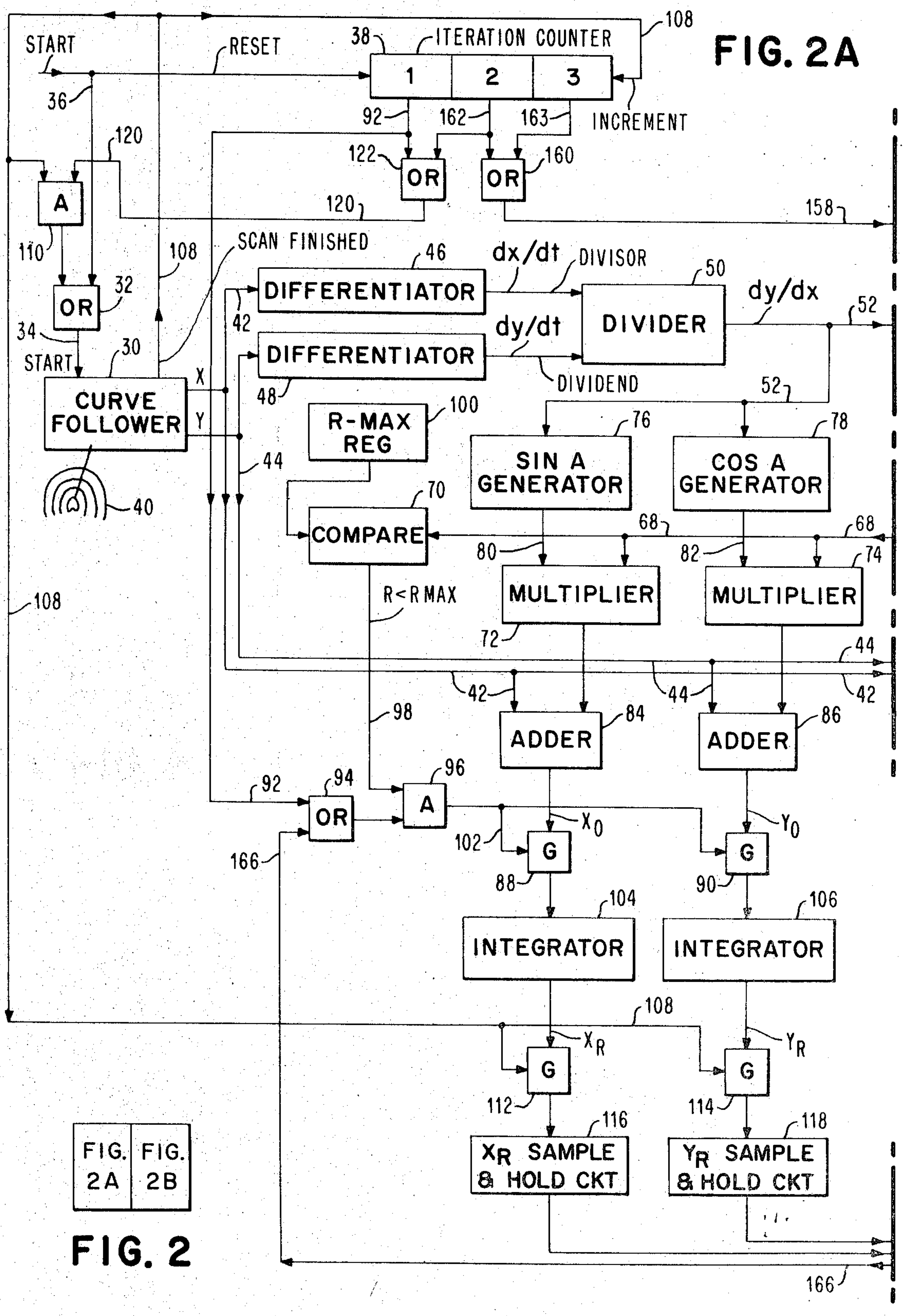
FIG. 2 is a diagram illustrating how
FIGS. 2A–2B are combined to form a composite block diagram of a preferred embodiment of the invention.
Figure 2B:
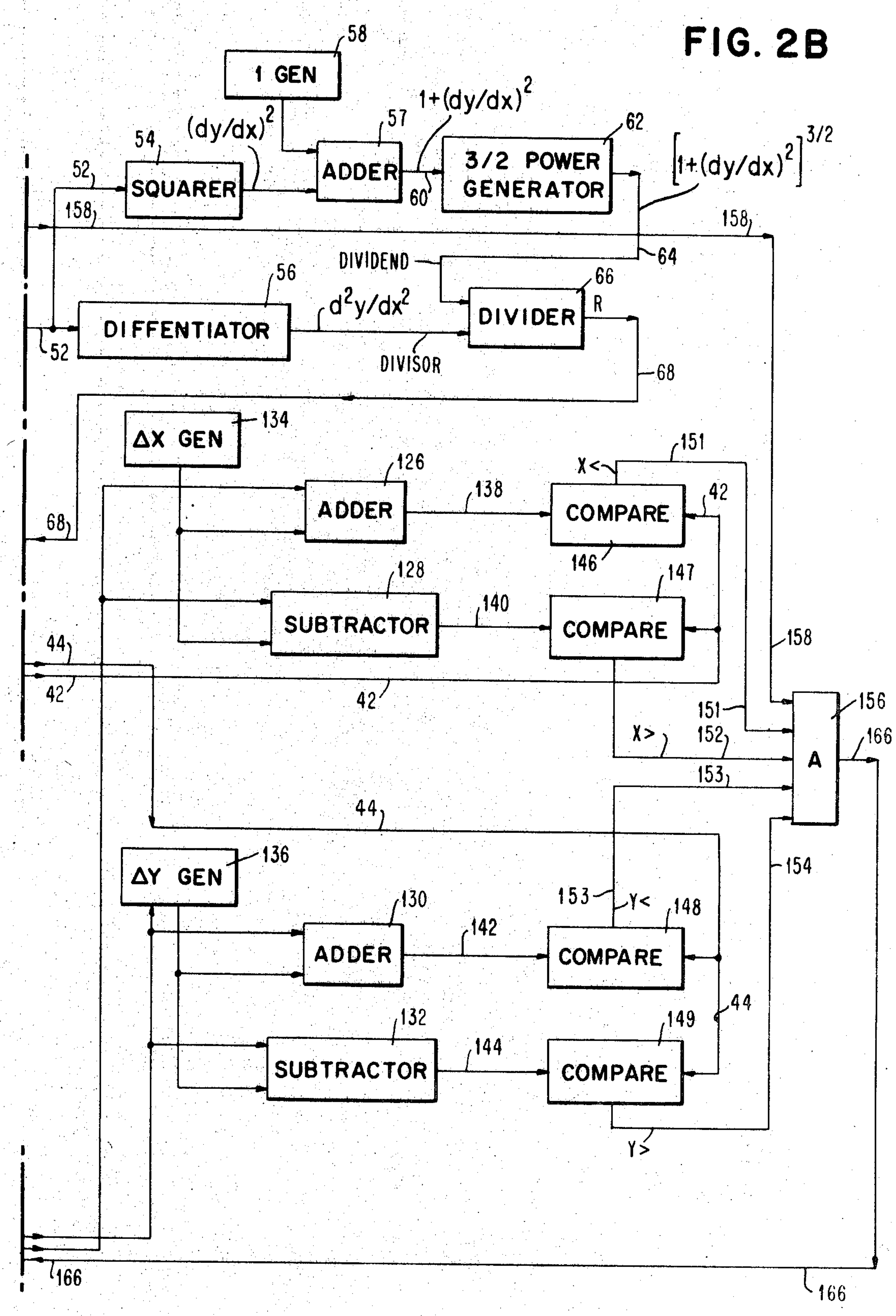

FIGS. 2A–2B when combined form a composite block diagram of a preferred embodiment of the invention.

Referring now to FIG. 1 it is seen that the fingerprint shown therein is made up of a plurality of curved lines which lines are referred to as ridges. For each point on each of the ridges of the fingerprint, a center of curvature exists. For example, for the point 10, on ridge 12, a center of curvature 14 exists. Further, there is a radius of curvature R between the points 10 and 14 and an angle A between a line drawn tangent to ridge 12 at point 10 and a line drawn through point 10 parallel to the X axis.

Assume now that the X and Y coordinates of the point 10 are known and that the X and Y coordinates of a number of points on ridge 12 immediately adjacent to point 10 are also known. From this date, the derivative of Y with respect to X ($dy/dx$) may be determined.

$$\text{Since } \frac{dy}{dx} = \tan A \qquad (1)$$

the angle A may be determined. Knowing the angle A, sin A and cos A may also be determined. In order to determine the coordinates of point 14 from the coordinates of point 10 it is also necessary to compute the value R of the radius of curvature. The second derivative of Y with respect to X may easily be computed using the X and Y coordinates of the points immediately adjacent to 10. Knowing this, the radius of curvature may be computed by use of the following formula:

$$R = \frac{[1 + (dy/dx)^2]^{3/2}}{\frac{d^2y}{dx^2}} \qquad (2)$$

Knowing the X and Y coordinates of point 10, the radius of curvature R, sin A and cos A, the X and Y coordinates (XO and YO respectively) of the center of curvature (i.e., point 14) may be computed by use of the following formula:

$$X_0 = X + R \sin A$$
$$Y_0 = Y + R \cos A \qquad (3)$$

When $X_0$ and $Y_0$ have been determined for each point on the fingerprint, the coordinates of the average center of curvature of the print may be obtained by integrating the $X_0$ and $Y_0$ values with respect to time. Therefore, $$X_R = \int X_0 dt$$
$$Y_R = \int Y_0 dt \qquad (4)$$

If the entire fingerprint shown in FIG. 1 is used in making the determination of $X_R$ and $Y_R$, the point at the intersection of these two coordinates (i.e., the computed reference point) might, for example, be the point 16 on FIG. 1. However, if portions of the fingerprint are missing, blurred, or smudged, an initial determination of $X_R$ and $Y_R$, using the available ridges of the print, might, for example, yield as the reference point, point 18. It is apparent that points 16 and 18 are too widely separated to satisfy the reproducibility criteria indicated earlier for a reference point determining system. However, if a square 20 is constructed with point 16 as its center, only ridges within the square are looked at during a second scan of the fingerprint, and $X_R$ and $Y_R$ are computed in the manner indicated above, a point, such as for example point 22, is found to be the point at the intersection of the computed coordinates. If a square of the same size as square 20 is constructed with point 18 as its center, only ridges within this square are used in computing $X_R$ and Y R and these coordinates are determined as indicated above, a point such as point 24 is determined to be the point at the intersection of the computed coordinates. It is seen that points 22 and 24 are quite close to each other and, for many purposes, may be close enough to satisfy the reproducibility criteria. If a higher degree of reproducibility is required, a third scan may be performed with either point 22 or point 24 used as the center of a square of the same size as the square 20, and only ridges within the square being used in the computation. When this is done, it is found that with either point 22 or point 24 at the center of the square, the reference point determined is the point 26. It has been found that if the received prints are in reasonably good condition, three scans will generally yield the desired reproducible reference point, and two scans will generally give adequate results for most purposes.

CIRCUIT DESCRIPTION

FIGS. 2A–2B show a block diagram of an electrical circuit for performing the reference point computations indicated in the preceding section. Referring now to FIG. 2A it is seen that the system includes a curve follower 30 which is started by a signal applied through OR gate 32 to line 34. Curve follower 30 may be a fully automatic device such as a modified form of the curve follower shown in copending patent application Ser. No. 306,119, now U.S. Pat. No. 3,289,004, filed on behalf of E. Greanias et al. on Sept. 3, 1963 and assigned to the assignee of the instant application. In the alternative, the curve follower may be a semiautomatic device, such as a pantograph, which is operated by having a relatively unskilled operator trace the fingerprint pattern with the pen thereof.

In operation, a start signal is initially applied through line 36 and OR gate 32 to start line 34 of curve follower 30. The signal on line 36 is also applied to reset iteration counter 38 to a count of one indicating that a first scan of the fingerprint 40 is now being performed. As curve follower 30 follows the lines of the fingerprint it continuously generates a voltage indicating the X coordinate of the point being scanned on line 42 and a voltage indicating the Y coordinate of the point being scanned on line 44. The voltages on lines 42 and 44 are applied through differentiators 46 and 48 respectively to the divisor and dividend inputs respectively, of divider 50. The output from divider 50 is the derivative of Y with respect to X $(dy/dx)$.

The derivative on line 52 is applied as the input to squarer circuit 54 (FIG. 2B) and differentiator 56. The output of squarer 54 is applied as one input to adder 57 the other input to this adder being the output from 1 generator 58. The quantity obtained on output line 60 from adder 57 is shown adjacent thereto. This quantity is applied as the input to three-half power generator 62. Three-half power generator 62 can either be a single circuit or a combination of a multiplier, and a square root generator. The quantity appearing on output line 64 from generator 62, which quantity is shown adjacent thereto, is applied to the dividend input of divider 66. The divisor input to divider 66 is the second derivative output from differentiator 56. From equation (2) it is seen that the output from divider 66 is the radius of curvature (R) for the point on the fingerprint being scanned.

The quantity R on output line 68 from divider 66 is applied as one input to compare circuit 70 (FIG. 2A) and multipliers 72 and 74. It will be remembered from previous discussion that the quantity $(dy/dx)$ on line 52 is equal to tan A (i.e., see equation (1). This quantity is applied to sin A generator 76 and cos A generator 78. Output line 80 from sin generator 76 is connected as the second input to multiplier 72 and output line 82 from cos generator 78 is connected as the second input to multiplier 74. The output from multiplier 72, which is equal to the quantity R sin A, is applied as one input to adder 84 and the output from multiplier 74, which is equal to the quantity R cos A, is applied as one input to the adder 86. The second input to adder 84 is X line 42 and the second input to adder 86 is Y line 44. The output from adder 84 is therefore the quantity (X + R sin A) and the output from adder 86 is therefore the quantity (Y+ R cos A). From equation (3) it is seen that the outputs from adders 84 and 86 are the quantities $X_0$ and $Y_0$ respectively. These quantities are applied as the information inputs to gates 88 and 90 respectively.

It will be remembered from previous discussion that, during the first scan iteration, the entire fingerprint being scanned is considered, while for subsequent iterations only ridges within a window having its center at the reference point determined by the first iteration are considered. Part of the function of gates 88 and 90 is to perform the selection operation just described. For the first iteration this is accomplished by applying the signal on output line 92 from the 1 position of iteration counter 38 through OR gate 94 to one input of AND gate 96. The other input to AND gate 96 is R-less-than-Rmax. output line 98 from compare circuit 70. It will be appreciated that, as the line being scanned approaches a straight line, the radius of curvature for the ridge approaches infinity. The very large values of R obtained under these conditions tend to saturate the circuits which they are applied to and tend to distort the center of curvature determination being made. Therefore, an Rmax. value is selected and stored in register 100. This quantity is applied as the other input to compare circuit 70 and a signal applied by compare circuit 70 to AND gate 96 only if the R value computed is less than Rmax. Therefore, the very large values of R are not used in making the center of curvature determination. Output line 102 from AND gate 96 is connected to condition gates 88 and 90 to apply the center of curvature coordinates applied thereto to integrators 104 and 106 respectively.

As curve follower 30 continues to scan fingerprint 40 successive values of $X_0$ and $Y_0$ are applied to integrators 104 and 106 respectively and an average of the values applied to the integrators is continuously accumulated. When curve follower 30 has completed a first scan of fingerprint 40, a signal is generated on lines 108 which signal is applied to increment iteration counter 38 to a count of 2, as one input to AND gate 110, and as a conditioning input to gates 112 and 114. The information inputs to gates 112 and 114 are the average center-of-curvature coordinates, $X_R$ and $Y_R$ respectively, determined by integrators 104 and 106. When gates 112 and 114 are conditioned, these quantities are passed into $X_R$ sample and hold circuit 116 and $Y_R$ sample and hold circuit 118 respectively. The second input to AND gate 110 is output line 120 from OR gate 122. One input to OR gate 122 is output line 92 from the one position of iteration counter 38. AND gate 110 is therefore fully conditioned at this time to generate an output signal which is applied through OR gate 32 to start line 34 of curve follower 30. The curve follower is, in this manner, restarted to begin a second scan of the fingerprint 40.

It will be remembered from previous discussion that, during the second scan of fingerprint 40, only ridges within the square 20 (FIG. 1) are considered in making the determination of the desired reference point. The boundaries of square 20 are determined by applying the $X_R$ value in circuit 116 as one input to adder 126 and as one input to subtractor 128. Similarly, the $Y_R$ value in circuit 118 is applied as one input to adder 130 and as one input to subtractor 132. The other input to adder 126 and subtractor 128 is a $\Delta$ X value set into $\Delta$ X generator 134 and the other input to adder 130 and subtractor 132 is a $\Delta$ Y value set into $\Delta$ Y generator 136. The $\Delta$ X value and the $\Delta$ Y value are, for a square window 20, each equal to one half the size of the square. The quantity on output line 138 from adder 126 is therefore the X coordinate of the right-hand boundary of square 20 and the quantity on output line 140 from subtractor 128 is the X coordinate of the left-hand boundary of the square. Similarly, the quantity on output line 142 from adder 130 is the Y coordinate of the upper boundary of square 20 and the quantity of output line 144 from subtractor 132 is the Y coordinate of the lower boundary of the square. The quantities on lines 138, 140, 142, and 144 are applied as one input to compare circuits 146—149 respectively. The other input to compare circuits 146 and 147 is X line 42 and the other input to compare circuits 148 and 149 is Y line 44. X-less-than output line 151 from compare circuit 146, X-greater-than output 152 from compare circuit 147, Y-less-than output line 153 from compare circuit 148, and Y-greater-than output line 154 from compare circuit 149 are connected as four of the inputs to AND gate 156. The final input to AND gate 156 is output line 158 from OR gate 160. Since the inputs to OR gate 160 are the 2-position and 3-positions output lines, 162 and 163 respectively, from iteration counter 48, a signal on line 158 indicates that the system is performing either a second or a third scan on fingerprint 40. If all inputs to AND gate 156 are present, it means that, during a second or third scan of fingerprint 40, the coordinates of the print being looked at are within window 20. Under these conditions it is desired to pass the coordinates of the center of curvature which have been computed in a manner the same as that previously described for the first scan, to integrators 104 and 106. Therefore, output line 166 from AND gate 156 is connected through OR gate 94 (FIG. 2A), as one input to AND gate 96. If the radius of curvature of the point being looked at is less than Rmax., AND gate 96 is therefore conditioned to generate an output signal on line 102 which conditions gates 88 and 90 to pass the radius-of-curvature values computed for the point being scanned into integrators 104 and 106.

If, during the second or third scan of fingerprint 40, a point outside of window 20 (FIG. 1) is being scanned, one of the compare circuits 146—149 will not be generating an output signal on the corresponding line 151—154. For example, if the point being looked at is above window 20, Y will be greater than the value applied through line 142 to compare circuit 148, and there will be no signal on line 153. Under these conditions AND gate 156 is not fully conditioned to generate an output signal on line 166 and gates 88 and 90 are therefore deconditioned. The $X_0$ and $Y_0$ values generated by adders 84 and 86 respectively under these conditions are therefore not applied to the respective integrators to be averaged into the computation of the desired reference point.

When curve follower 30 has completed a second scan of fingerprint 40 it again generates an output signal on line 108 which is applied to increment iteration counter 38 to a count of 3, to condition gates 112 and 114 to pass the coordinates of the new reference point into $X_R$ circuit 116 and $Y_R$ circuit 118, and as a conditioning input to AND gate 110. Since iteration counter 38 is at a count of 2 when the signal appears on line 108, OR gate 122 applies a second input to AND gate 110 causing an output signal which is applied through OR gate 132 to restart curve follower 30. The system then performs a third scan on fingerprint 40 in a manner identical to that described above for the second scan, the only difference being that the window used to limit the points on the fingerprint being looked at is now centered at the reference point computed during the second iteration. When the third scan has been completed, an output signal is again generated on line 108 which signal is applied to iteration counter 38 to attempt to increment it and to gates 112 and 114 to condition these gates to pass the new computed values of $X_R$ and $Y_R$ into sample and hold circuits 116 and 118 respectively. The signal applied to counter 38 is ineffective at this time since the counter has already been incremented to its maximum value. The signal applied through line 108 to AND gate 110 is also ineffective at this time since no input is being applied to OR gate 122. A new start signal is therefore not applied to curve follower 30 and the operation is terminated. The reference point defined by the X and Y values stored in circuits 116 and 118 respectively may be used for any desired purpose such as, for example, in recognizing or classifying the fingerprint 40 being looked at.

While in the embodiment of the invention shown in FIGS. 2A and 2B, three scans have been provided for, it is apparent that, as indicated previously, two scans may be adequate for the operation being performed and the system may be suitably modified to effect this change. When an extremely high level of accuracy is required in reproducing the reference point, four or more scans may be provided for by suitably modifying the iteration counter and the associated circuitry.

In FIG. 2B, a Δ X generator 134 and a Δ Y generator 136 have been provided. It is apparent that when a square window, such as window 20 in FIG. 1, is being employed, only a single delta generator is required. While in the preferred embodiment of this invention, a square or rectangular window has been employed, it is apparent that windows of other shapes could be employed as, for example, a circular window.

It is also apparent that while analogue voltages have been applied through lines 42 and 44 to analogue arithmetic and logical elements in the circuit of FIGS. 2A and 2B, the quantities on lines 42 and 44 could be digitized before being applied to the remainder of the circuit in which case the elements shown in FIGS. 2A and 2B would be digital rather than analogue components. Similarly, while the angle A has been used in equation 3, this has been done primarily because of the ease with which it may be computed. Angle A', which is the complement of angle A, may also be used in equation 3 if the sin and cos terms are reversed (i.e., sin A= cos A' and cos A = sin A').

In the discussion so far, no mention has been made of the manner in which the fingerprint 40 is oriented with respect to curve follower 30. While varying the orientation of the fingerprint will change the X and Y values computed for the reference point, its actual position on the fingerprint relative to the ridges thereof will always be same, regardless of the fingerprint orientation. Also, since the method used for determining the reference point is a statistical one, a failure to consider several of the ridges in making the center point determination will not materially effect the location of the point determined.

While it might seem impractical to perform two or three scans on a fingerprint merely to determine a reference point thereon, it should be pointed out that, during the scans, additional data may also be accumulated by other circuitry which data may be used in conjunction with the center point determined in order to identify or classify the fingerprint 40 being looked at. It should also be pointed out that while, in the preferred embodiment of the invention, center of curvature is used as the criterion for selecting a reference point, other criteria, such as tangent line intersections, may, by use of suitable circuitry, be used for making this determination.

While the invention has been particularly shown and described with reference to a preferred embodiment thereof, it will be understood by those skilled in the art that the foregoing and other changes in form and details may be made therein without departing from the spirit and scope of the invention.

I claim:

1. A system for determining a reference point on a line pattern comprising:

means for determining the values of the coordinates of a plurality of unique points relative to a reference axis, which points are related in a predetermined manner to a large number of points of a line pattern;

means for averaging the values of the coordinates of said unique points; and means for selecting as a reference point, the point determined as the average of the values of said coordinates of said unique points.

2. A system of the type described in claim 1 wherein at least some of the lines of said line pattern are curved and wherein the unique points determined are the centers of curvature for the small segment of line immediately adjacent to each of said large number of points in each of said lines.

3. A system of the type described in claim 2 wherein said large number of points is distributed substantially throughout said line pattern, where the centers of curvature are within predetermined limits.

4. A system of the type described in claim 3 including:

means for defining an area on said line pattern related in a predetermined manner to said average unique point; and means including all of said above described means for making a second average unique point determination, using only points on lines of the pattern within said defined area, and for using said second average unique point as said reference point.

5. A system of the type described in claim 4 wherein the first average unique point is at the center of said defined area.

6. A system of the type described in claim 2 wherein said line pattern is a fingerprint.

7. A system of the type described in claim 2 wherein said center of curvature determining means includes the means for determining the radius of curvature for each of said large number of points; means for determining an angular relationship between said center of curvature and said reference axis; and means for utilizing said radius of curvature except when above a maximum limit and said angular relationship to compute the coordinates of said center of curvature.

8. A system of the type described in claim 7 wherein said radius of curvature determining means utilizes the relationship:

$$R=\frac{\left[1+\left(\frac{dy}{dx}\right)^2\right]^{3/2}}{\frac{d^2y}{dx}}$$

9. A system of the type described in claim 8 including means for determining $(dy/dx)$ for each of said large number of points; wherein said angular relationship determining means makes use of the fact that $(dy/dx)$ is equal to tan A where A is the angle between a line drawn tangent to the point being looked at and a line drawn through the point parallel to the $x$ axis; and wherein said center of curvature determining means makes use of the relationships: $X_0 = X + R \sin A$ $Y_0 = Y + R \cos A$ 10. A system for determining a reference point in a fingerprint pattern by means of determining the average relative center of curvature of the ridges of the pattern comprising means for following a curve and means for measuring the X axis and Y axis values traversed by said curve follower coupled to X differentiating means for differentiating the X axis values with respect to time and Y differentiating means for differentiating the Y axis values with respect to time, said X and Y differentiating means having outputs connected to the input of means for dividing providing an output in response to $dy/dt$ and $dx/dt$ inputs of $dy/dx$, said $dy/dx$output from said means for dividing being connected to the input of means for squaring and to the input of second means for differentiating:

said second means for differentiating having an output connected to an input of second means for dividing, said means for squaring having an output connected to an input of means for adding, unit generator means having an output connected to another input of said means for adding, and said means for adding having an output connected to means for generating the three-seconds power of an input having an output connected to another input of said second means for dividing.

PO-1050
(5/69)

UNITED STATES PATENT OFFICE
CERTIFICATE OF CORRECTION

Patent No. 3,558,864 Dated December 29, 1965

Inventor(s) Walter K. French

It is certified that error appears in the above-identified patent and that said Letters Patent are hereby corrected as shown below:

In the Patent:

Claim 10 line 31 "three-seconds" should be -- 3/2 --

In the Application:

Page 19 line 22 States "3/2"

Signed and sealed this 18th day of January 1972.

(SEAL)
Attest:

EDWARD M.FLETCHER,JR.
Attesting Officer

ROBERT GOTTSCHALK
Acting Commissioner of Patent